(12) United States Patent
O'Connell et al.

(10) Patent No.: US 8,668,013 B2
(45) Date of Patent: Mar. 11, 2014

(54) PLUG COUNTER, FRACING SYSTEM AND METHOD

(71) Applicants: Maria M. O'Connell, Cypress, TX (US); Yang Xu, Houston, TX (US); Hector H. Mireles, Houston, TX (US); Lale Korkmaz, Houston, TX (US)

(72) Inventors: Maria M. O'Connell, Cypress, TX (US); Yang Xu, Houston, TX (US); Hector H. Mireles, Houston, TX (US); Lale Korkmaz, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/628,754

(22) Filed: Sep. 27, 2012

(65) Prior Publication Data

US 2013/0025871 A1 Jan. 31, 2013

Related U.S. Application Data

(62) Division of application No. 12/862,128, filed on Aug. 24, 2010.

(51) Int. Cl.
*E21B 34/00* (2006.01)
(52) U.S. Cl.
USPC ................ 166/318; 166/308.1; 166/331
(58) Field of Classification Search
USPC .............. 166/308.1, 177.5, 332.1, 373, 332.4
See application file for complete search history.

(56) References Cited

U.S. PATENT DOCUMENTS

| | | | |
|---|---|---|---|
| 1,883,071 A | 12/1928 | Stone | |
| 2,769,454 A | 11/1956 | Bletcher et al. | |
| 2,812,717 A | 11/1957 | Brown | |
| 2,822,757 A | 2/1958 | Colberly | |
| 2,973,006 A | 2/1961 | Nelson | |
| 3,007,527 A | 11/1961 | Nelson | |
| 3,013,612 A | 12/1961 | Angel | |
| 3,148,731 A | 9/1964 | Holden | |
| 3,211,232 A | 10/1965 | Grimmer | |
| 3,263,752 A | 8/1966 | Conrad | |

(Continued)

FOREIGN PATENT DOCUMENTS

| | | |
|---|---|---|
| CA | 2760107 | 11/2010 |
| EP | 0427422 A2 | 5/1991 |
| GB | 2281924 | 3/1995 |
| WO | 0015943 | 3/2000 |

OTHER PUBLICATIONS

Response to Restriction Requirement dated Apr. 22, 2009 in U.S. Appl. No. 11/891,715, U.S. Patent and Trademark Office, U.S.A.

(Continued)

*Primary Examiner* — Yong-Suk (Philip) Ro
(74) *Attorney, Agent, or Firm* — Cantor Colburn LLP

(57) ABSTRACT

A plug counter includes a seat receptive of a plug in a first position and capable of passing the plug in a second position. A first sleeve is in operable communication with the seat and is longitudinally movable in response to movement of the seat between the first position and the second position. A second sleeve is in operable communication with at least one of the first sleeve and the seat and is configured to index upon passage of the plug. A key is in operable communication with the seat and is configured to prevent movement of the seat to the second position after a selected number of plugs have passed the seat. A third sleeve is in operable communication with the first sleeve, and a release member is in operable communication with the third sleeve and is configured to move the third sleeve after it is released.

15 Claims, 6 Drawing Sheets

(56) References Cited

U.S. PATENT DOCUMENTS

| | | | |
|---|---|---|---|
| 3,358,771 A | 12/1967 | Berryman |
| 3,510,103 A | 5/1970 | Carsello |
| 3,566,964 A | 3/1971 | Livingston |
| 3,583,714 A | 6/1971 | Weltzer et al. |
| 3,599,998 A | 8/1971 | Kiwalle et al. |
| 3,667,505 A | 6/1972 | Radig |
| 3,669,462 A | 6/1972 | Parsons |
| 3,703,104 A | 11/1972 | Tamplen |
| 3,727,635 A | 4/1973 | Todd |
| 3,797,255 A | 3/1974 | Kammerer, Jr. et al. |
| 3,901,315 A | 8/1975 | Parker et al. |
| 3,954,138 A | 5/1976 | Miffre |
| 3,997,003 A | 12/1976 | Adkins |
| 4,067,358 A | 1/1978 | Streich |
| 4,160,478 A | 7/1979 | Calhoun et al. |
| 4,176,717 A | 12/1979 | Hix |
| 4,190,239 A | 2/1980 | Schwankhart |
| 4,246,968 A | 1/1981 | Jessup et al. |
| 4,260,017 A | 4/1981 | Nelson et al. |
| 4,291,722 A | 9/1981 | Churchman |
| 4,292,988 A | 10/1981 | Montgomery |
| 4,355,685 A | 10/1982 | Beck |
| 4,390,065 A | 6/1983 | Richardson |
| 4,448,216 A | 5/1984 | Speegle et al. |
| 4,474,241 A | 10/1984 | Freeman |
| 4,478,279 A | 10/1984 | Puntar et al. |
| 4,537,383 A | 8/1985 | Fredd |
| 4,554,981 A | 11/1985 | Davies |
| 4,566,541 A | 1/1986 | Moussy et al. |
| 4,576,234 A | 3/1986 | Upchurch |
| 4,583,593 A | 4/1986 | Zunkel et al. |
| 4,669,538 A | 6/1987 | Szarka |
| 4,711,326 A | 12/1987 | Baugh et al. |
| 4,714,116 A | 12/1987 | Brunner |
| 4,729,432 A | 3/1988 | Helms |
| 4,762,447 A | 8/1988 | Marantette |
| 4,823,882 A | 4/1989 | Stokley et al. |
| 4,826,135 A | 5/1989 | Mielke |
| 4,856,591 A | 8/1989 | Donovan et al. |
| 4,893,678 A | 1/1990 | Stokley et al. |
| 4,944,379 A | 7/1990 | Haaser |
| 4,979,561 A | 12/1990 | Szarka |
| 5,029,643 A | 7/1991 | Winslow et al. |
| 5,056,599 A | 10/1991 | Comeaux et al. |
| 5,230,390 A | 7/1993 | Zastresek et al. |
| 5,244,044 A | 9/1993 | Henderson |
| 5,297,580 A | 3/1994 | Thurman |
| 5,305,837 A | 4/1994 | Johns et al. |
| 5,335,727 A | 8/1994 | Cornette et al. |
| 5,343,946 A | 9/1994 | Morrill |
| 5,398,947 A | 3/1995 | Cook |
| 5,529,126 A | 6/1996 | Edwards |
| 5,609,178 A | 3/1997 | Hennig et al. |
| 5,704,393 A | 1/1998 | Connell et al. |
| 5,762,142 A | 6/1998 | Connell et al. |
| 5,775,421 A | 7/1998 | Duhon et al. |
| 5,775,428 A | 7/1998 | Davis et al. |
| 5,813,483 A | 9/1998 | Latham et al. |
| 5,960,881 A | 10/1999 | Allamon et al. |
| 6,050,340 A | 4/2000 | Scott |
| 6,053,250 A | 4/2000 | Echols |
| 6,079,496 A | 6/2000 | Hirth |
| 6,102,060 A | 8/2000 | Howlett et al. |
| 6,155,350 A | 12/2000 | Melenyzer |
| 6,173,795 B1 | 1/2001 | McGarian et al. |
| 6,220,350 B1 | 4/2001 | Brothers et al. |
| 6,227,298 B1 | 5/2001 | Patel |
| 6,253,861 B1 | 7/2001 | Carmichael et al. |
| 6,293,517 B1 | 9/2001 | Cunningham |
| 6,378,609 B1 | 4/2002 | Oneal et al. |
| 6,474,412 B2 | 11/2002 | Hamilton et al. |
| 6,530,574 B1 | 3/2003 | Bailey et al. |
| 6,547,007 B2 | 4/2003 | Szarka et al. |
| 6,634,428 B2 | 10/2003 | Krauss et al. |
| 6,644,412 B2 | 11/2003 | Bode et al. |
| 6,666,273 B2 | 12/2003 | Laurel |
| 6,668,933 B2 | 12/2003 | Kent |
| 6,681,860 B1 | 1/2004 | Yokley et al. |
| 6,712,145 B2 | 3/2004 | Allamon |
| 6,712,415 B1 | 3/2004 | Darbishire et al. |
| 6,834,726 B2 | 12/2004 | Giroux et al. |
| 6,866,100 B2 | 3/2005 | Gudmestad et al. |
| 6,896,049 B2 | 5/2005 | Moyes |
| 6,948,561 B2 | 9/2005 | Myron |
| 6,983,795 B2 | 1/2006 | Zuklic et al. |
| 7,150,326 B2 | 12/2006 | Bishop et al. |
| 7,322,408 B2 | 1/2008 | Howlett |
| 7,322,417 B2 | 1/2008 | Rytlewski et al. |
| 7,325,617 B2 | 2/2008 | Murray |
| 7,337,847 B2 | 3/2008 | McGarian et al. |
| 7,350,578 B2 | 4/2008 | Szarka et al. |
| 7,377,321 B2 | 5/2008 | Rytlewski |
| 7,387,165 B2 | 6/2008 | Lopez de Cardenas et al. |
| 7,416,029 B2 | 8/2008 | Telfer et al. |
| 7,467,664 B2 | 12/2008 | Cochran et al. |
| 7,503,390 B2 | 3/2009 | Gomez |
| 7,503,392 B2 | 3/2009 | King et al. |
| 7,520,336 B2 | 4/2009 | Mondelli et al. |
| 7,730,953 B2 | 6/2010 | Casciaro |
| 7,832,472 B2 | 11/2010 | Themig |
| 7,971,883 B2 | 7/2011 | Soroka et al. |
| 2001/0007284 A1 | 7/2001 | French et al. |
| 2004/0007365 A1 | 1/2004 | Hill et al. |
| 2005/0061372 A1 | 3/2005 | McGrath et al. |
| 2005/0072572 A1 | 4/2005 | Churchill |
| 2005/0126638 A1 | 6/2005 | Gilbert |
| 2005/0205264 A1 | 9/2005 | Starr et al. |
| 2006/0124310 A1 | 6/2006 | Lopez de Cardenas et al. |
| 2006/0169463 A1 | 8/2006 | Howlett |
| 2006/0175092 A1 | 8/2006 | Mashburn |
| 2006/0213670 A1 | 9/2006 | Bishop et al. |
| 2006/0243455 A1 | 11/2006 | Telfer et al. |
| 2007/0007007 A1 | 1/2007 | Themig et al. |
| 2007/0012438 A1 | 1/2007 | Hassel-Sorensen |
| 2007/0023087 A1 | 2/2007 | Krebs et al. |
| 2007/0095538 A1 | 5/2007 | Szarka et al. |
| 2007/0272413 A1 | 11/2007 | Rytlewski et al. |
| 2008/0066924 A1 | 3/2008 | Xu |
| 2008/0093080 A1 | 4/2008 | Palmer et al. |
| 2008/0190620 A1 | 8/2008 | Posevina et al. |
| 2008/0217025 A1 | 9/2008 | Ruddock et al. |
| 2008/0308282 A1 | 12/2008 | Standridge et al. |
| 2009/0032255 A1 | 2/2009 | Surjaatmadja et al. |
| 2009/0044944 A1* | 2/2009 | Murray et al. ............ 166/308.1 |
| 2009/0044946 A1 | 2/2009 | Schasteen et al. |
| 2009/0044955 A1 | 2/2009 | King et al. |
| 2009/0056934 A1 | 3/2009 | Xu |
| 2009/0056952 A1 | 3/2009 | Churchill |
| 2009/0107680 A1 | 4/2009 | Surjaatmadja |
| 2009/0159289 A1 | 6/2009 | Avant et al. |
| 2009/0308588 A1 | 12/2009 | Howell et al. |
| 2010/0294514 A1 | 11/2010 | Crow et al. |
| 2011/0108284 A1* | 5/2011 | Flores et al. ................. 166/373 |
| 2011/0180274 A1 | 7/2011 | Wang et al. |

OTHER PUBLICATIONS

Office Action dated Apr. 9, 2009, in U.S. Appl. No. 11/891,715, U.S. Patent and Trademark Office, U.S.A.

Ross, C. M., et al., "Current Materials and Devices for Control of Fluid Loss," SPE 54323, Apr. 1999, pp. 1-16.

Hoffman, C.R., "One-Trip Sand-Control/Liner Hangar/ Big-Bore Completion System," SPE 101086, Sep. 2006, pp. 1-10.

Baker Hughes, Baker Oil Tools, Conventional Fishing Technical Unit; Pump Out Sub Product Family No. H14061, Jun. 7, 2005, 1 page.

International Search Report, Feb. 11, 2009 pp. 1-3, PCT/US2008/072732, Korean Intellectual Property Office.

International Search Report, Feb. 11, 2009, pp. 1-3, PCT/US2008/072734, Korean Intellectual Property Office.

International Search Report, Feb. 11, 2009, pp. 1-3, PCT/US2008/072735, Korean Intellectual Property Office.

(56) References Cited

OTHER PUBLICATIONS

Notification of Transmittal of the International Search Report and the Written Opinion of the International Searching Authority, or the Declaration, Feb. 11, 2009, pp. 1-4, PCT/US2008/072732, Korean Intellectural Property Office.
Notification of Transmittal of the International Search Report and the Written Opinion of the International Searching Authority, or the Declaration, Feb. 11, 2009, pp. 1-4, PCT/US2008/072734, Korean Intellectual Property Office.
Notification of Transmittal of the International Search Report and the Written Opinion of the International Searching Authority, Or the Decclaration, Feb. 11, 2009, pp. 1-4, PCT/US2008/072735, Korean Intellectual Property Office.
Written Opinion of the International Searching Authority, Feb. 11, 2009, pp. 1-3, PCT/US2008/072732, Korean Intellectual Property Office.
Written Opinion of the International Searching Authority, Feb. 11, 2009, pp. 1-4, PCT/US2008/072734, Korean Intellectual Property Office.
Written Opinion of the International Searching Authority, Feb. 11, 2009, pp. 1-4, PCT/US2008/072735, Korean Intellectual Property Office.
G.L. Rytlewski, A Study of Fracture Initiation Pressures in Cemented Cased-Hole Wells Without Perforations, May 15, 2006, pp. 1-10, SPE 100572, Society of Petroleum Engineers, U.S.A.
Boscan, J. et al. "Successful Well Testing Operations in High-Pressure/High-Temperature Encironment; Case Histories," SPE 84096, Oct. 2003, pp. 1-15.
International Search Report, Jan. 19, 2009, pp. 1-3, PCT/US2008/072470, Korean Intellectual Property Office.
Notification of Transmittal of the International Search Report and the Written Opinion of the International Searching Authority, or the Declaration, Jan. 19, 2009, pp. 1-4, PCT/US2008/072470, Korean Intellectual Property Office.
Written Opinion of the International Searching Authority, Jan. 19, 2009, pp. 1-3, PCT/US2008/072470, Korean Intellectual Property Office.
Notice of Allowance & Fees Due and Notice of Allowability dated Jan. 5, 2009, in U.S. Appl. No. 11/891,713, U.S. Patent and Trademark Office, U.S.A.
Office Action dated Jul. 16, 2008 in U.S. Appl. No. 11/891,713 U.S. Patent and Trademark Office, U.S.A.
Office Action dated Jun. 19, 2009, in U.S. Appl. No. 11/891,715, U.S. Patent and Trademark Office, U.S.A.
Office Action dated Jun. 25, 2009, in U.S. Appl. No. 11/891,714, USPTO, U.S.A.
Brad Musgrove, Multi-Layer Fracturing Solution Treat and Produce Completions, Nov. 12, 2007, pp. 1-23, Schlumberger, U.S.A.
Response to Office Action dated Oct. 15, 2008, in U.S. Appl. No. 11/891,713, U.S. Patent and Trademark Office, U.S.A.
RFID Keystone Module, RFID & Intelligent Products, Petrowell retrieved online on May 27, 2009 from: http://www.petrowell.co.uk/index2.php?option=com_docman&task=doc_view&gid=15&Itemid=26.
StageFRAC Maximize Reservoir Drainage, 2007, pp. 1-2, Schlumberger, U.S.A.
TAP Completion System, Schlumberger, 4 pages, Dec. 2007.
International Search Report; PCT/US2010/044399; International Searching Authority KIPO; Mailed Mar. 21, 2011.
International Search Report and Written Opinion of the International Searching Authority; PCT/US2010/044378; Mailed Mar. 17, 2011.
Notification of Transmittal of the International Search Report and the Written Opinion of the International Searching Authority; PCT/US2010/044856; Mailed Apr. 15, 2011.
Notification of Transmittal of the International Search Report and the Written Opinion of the International Searching Authority; PCT/US2010/044383; Mailed Apr. 15, 2011.
International Search Report; PCT/US2010/033737; Korean Intellectual Property Office; Mailed Jan. 24, 2011.
International Search Report; Date of Mailing Jan. 24, 2011; International Appln No. PCT/US2010/034736; 3 Pages.
International Search Report; Date of Mailing Jan. 24, 2011; Internatiaonal Appln. No. PCT/US2010/034735; 3 Pages.
Nternational Search Report and Written Opinion; Date of Mailing Feb. 11, 2011; International Appln No. PCT/US2010/041049; International Search Report 5 Pages and Written Opinion 3 Pages.
Notification of Transmittal of the International Search Report and the Written Opinion of the International Searching Authority; PCT/US2010/054487; International Searching Authority; KIPO; Mailed Jun. 3, 2011.
Notification of Transmittal of the International Search Report and the Written Opinion of the International Searching Authority; PCT/US2010/049810; International Searching Authority KIPO; Mailed Apr. 25, 2011.
International Search Report and Written Opinion; Date of Mailing Aug. 29, 2011; International Application No. PCT/US2011/022523; International Filing Date Jan. 26, 2011; Korean Intellectual Property Office; International Search Report 5 pages; Written Opinion 3 pages.
Notification of Transmittal of the International Search Report and the Written Opinion of the International Searching Authority; PCT/US2011/041663; Korean Intellectual Property Office; Mailed Dec. 14, 2011; 8 pages.

* cited by examiner

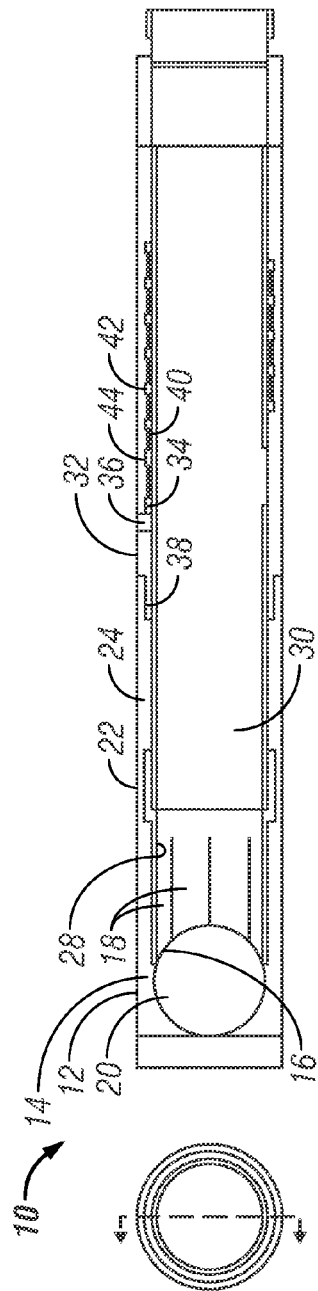
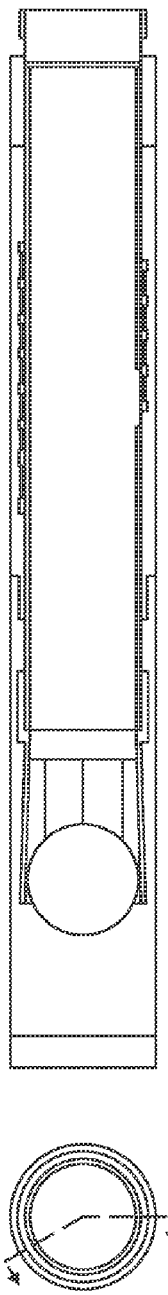
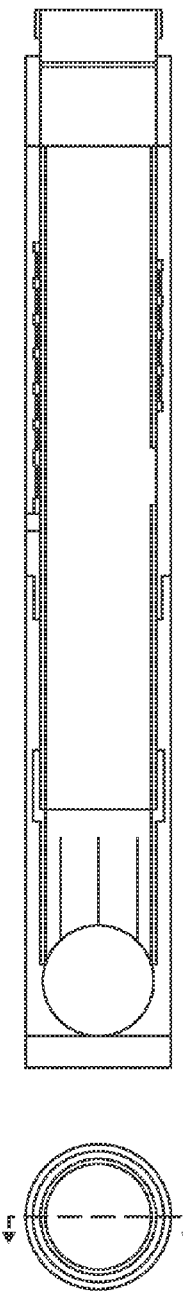
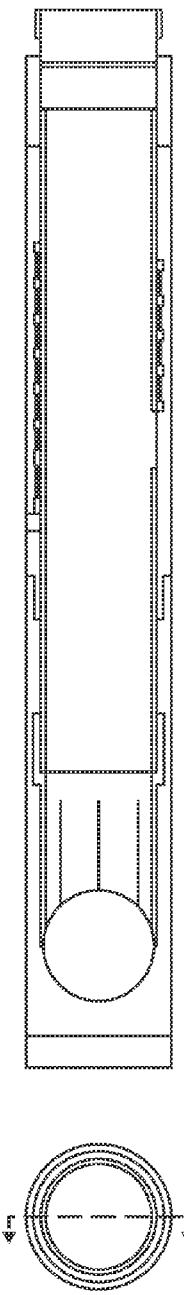
FIG. 1
FIG. 2
FIG. 3
FIG. 4

PLUG COUNTER, FRACING SYSTEM AND METHOD

CROSS REFERENCE TO RELATED APPLICATIONS

In This application claims the benefit of an earlier filing date from U.S. Non Provisional application Ser. No. 12/862,128 filed Aug. 24, 2010, the entire disclosure of which is incorporated herein by reference

BACKGROUND

In the Drilling and completion industries it is often desirable to affect tools or formations at a great distance from a surface located facility such as a rig. One example of an operation intended to affect a formation is a fracturing operation often referred to as fracing. In order to perform such an operation, hydraulic pressure is built within a tubing string until the pressure exceeds formation capability for holding that pressure and fractures the formation. This type of operation is most effective if done in small incremental sections of a borehole for reasons related to control and distribution of fractures to serve the ultimate purpose of the borehole. Such purposes include hydrocarbon production and Carbon Dioxide sequestration, for example.

In the art, fracturing discrete locations of the borehole tends to require a number of tools related to the pressuring of discrete locations. Where multiple fracturing locations are contemplated, generally a staged system must be built and administered correctly for it to work. One such system uses progressively larger seat diameters from the toe back to surface and then corresponding progressively increasing diameter plugs or balls. While the system works well, it is limited by the number of different size balls that can be used. Tolerance is also required in any system (due to such things as irregular shape of tubing secondary to borehole irregularity), which therefore further limits the number of diameters usable in a particular system.

Since fracturing and other operations where it is desirable to isolate discrete locations continue to become more prevalent and ubiquitous, alternate systems for accessing and manipulating the downhole environment are always well received.

SUMMARY

Disclosed herein is a plug counter. The plug counter includes a seat receptive of a plug in a first position and capable of passing the plug in a second position. A first sleeve is in operable communication with the seat and is longitudinally movable in response to movement of the seat between the first position and the second position. A second sleeve is in operable communication with at least one of the first sleeve and the seat and is configured to index upon passage of the plug. A key is in operable communication with the seat and is configured to prevent movement of the seat to the second position after a selected number of plugs have passed the seat. A third sleeve is in operable communication with the first sleeve, and a release member is in operable communication with the third sleeve and is configured to move the third sleeve with the first sleeve after it is released.

BRIEF DESCRIPTION OF THE DRAWINGS

Referring now to the drawings wherein like elements are numbered alike in the several Figures:

FIGS. 1-4 illustrate a cross sectional view of one embodiment of a portion of the tool disclosed herein in four different positions;

DETAILED DESCRIPTION

Figure 5:
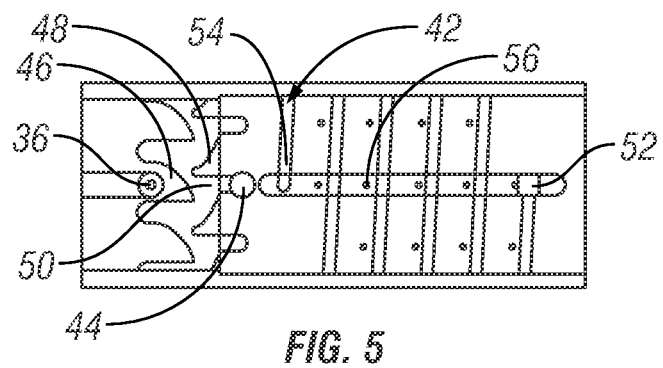
FIGS. 5-8 illustrate in partial transparent view a counter portion of the tool disclosed herein in four different positions corresponding to the positions shown in FIGS. 1-4.
Figure 6:
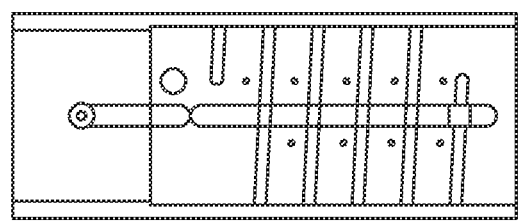
Figure 7:
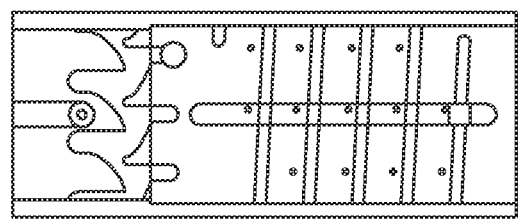

Referring to FIGS. 1-4, a portion of plug counter tool 10 is illustrated in longitudinal cross section in four different positions to make apparent not only its structural constituents but its operation as well. It is initially noted that the term "plug" as used herein is intended to encompass tripping balls, darts, and similar structures that can be propagated through a borehole and/or tubing string to reach remote locations therewithin. The plug counter tool embodiments disclosed herein facilitate the use of a single size plug for multiple actuation sequences. For example, where multiple fracture points are desired in a borehole, traditional fracturing would require a number of different diameter plugs used sequentially from smaller to larger as operations progress up the hole. With the tool embodiments described herein only one size plug is needed.

Referring directly to FIG. 1, an outer housing 12 includes a support 14 to support a moveable plug seat 16, which in the case of FIG. 1 is presented by a set of collet fingers 18. The support 14 and movable seat 16 operate together to catch a plug 20 after which the plug is passed or denied passage as discussed hereunder. The fingers 18 are supported by support 14 while the collet fingers are in a first position shown in FIG. 1. Support for the fingers 18 is dependent upon the position of collet 22, which is dependent upon the ability of a spring 24 to hold the collet 22 in the first position shown in FIG. 1. More specifically, when a plug is seated in the seat 16 pressure can and will in operation be built uphole of the plug. The spring rate of the spring 24 selected dictates the amount of fluid pressure that can be resisted before the collet 22 moves in a downhole direction and the fingers 18 become unsupported. The spring 24 is a compression spring and as illustrated is a coil spring. It will hold the collet 22 in the illustrated first position until a plug 20 engages the seat 16 and sufficient fluid pressure uphole of the plug overcomes the spring force of spring 24 and compresses the same. As the spring 24 is overcome by fluid pressure, the collet 22 moves in a downhole direction (to the right in the Figure) and moves the fingers 18 off of the support 14 to a second position. Just downhole of the support 14 is a plug passage recess 28 that will allow radial expansion of the fingers 18 (see FIG. 2) by an amount sufficient to allow passage of the plug 20 through the seat 16. After passage of the plug 20, fluid pressure equalizes across the seat 16 and the collet 22 returns to the first position of FIG. 1 under the bias of the spring 24.

Connected to the collet 22 is j-slot sleeve 30 also known as the first sleeve. The sleeve 30 moves axially of the tool 10 along with the collet 22. At a downhole end of the housing 12, an anti-rotation sleeve 32, also known as the second sleeve, is attached to the housing 12. Sleeve 32 does not move relative to housing 12 in any way once the tool is assembled. Anti-rotation sleeve 32 includes one or more pin openings 34 into which one or more pins 36 will be individually inserted. Each pin 36 will thus be fixed to the anti-rotation sleeve 32 and extend into an alignment groove 38 of which there will be one or more in the j-slot sleeve 30. The one or more pins 36 and respective alignment grooves 38 ensure that the j-slot sleeve 30 is not rotatable but is permitted to move only axially during operation of the tool 10. Upon movement of the collet 22 induced by fluid pressure uphole of plug 20 as described above, the j-slot sleeve 30 will cycle back and forth axially of the tool 10.

Radially inwardly of the anti-rotation sleeve 32 and rotatable relative thereto is a helix sleeve 40, also known as the third sleeve, exhibiting a helical track 42 at an outside surface thereof. The helix sleeve 40 includes one or more j-slot followers 44 (one shown), which may be a part of the helix sleeve 40 or may be a separate component that is engaged with the helix sleeve 40. In either event, the j-slot follower(s) 44 are configured to contact angled surfaces 46 and 48 of a j-slot 50 (see FIG. 5) disposed at the j-slot sleeve 30 upon axial movement of the j-slot sleeve 30. Because followers 44 are fixed to the helix sleeve 40, the helix sleeve 40 will move rotationally about the j-slot sleeve 30 as the followers 44 move along each angled surface 46 or 48. The impetus for this movement is the axial cycling of the j-slot sleeve 30 as described above. Each time a plug 20 lands at the seat 16, thereby allowing pressure to build from uphole against the plug 20, and hence urging the collet 22 to a position aligning the fingers 18 with recess 28, the followers 44 will contact and slide along one of the angled surfaces 46. This will cause a measured or indexed rotation of the helix sleeve 40. Because the spring 24 is compressed during this pressure induced axial movement, energy is stored that will be used to urge the followers 44 along the next adjacent angled surface 48 pursuant to the j-slot sleeve 30 moving uphole under spring bias, causing another measured or indexed rotation of the helix sleeve 40. The spring 24 induces such movement only after the plug 20, against which fluid pressure had been applied, is released.

Figure 8:
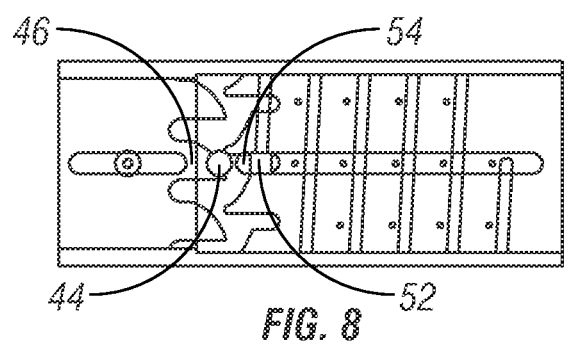

As the helix sleeve 40 rotates, a key 52 that is engaged with the helical track 42 moves leftward in the drawing closer to an end 54 of a keyway 56. It is to be appreciated that although the illustrated embodiment moves in an uphole direction, the tool 10 can easily be configured to allow movement of the key 52 in a downhole direction by reversing the helix angle of the helical track 42 and reversing the surface angles of surfaces 46 and 48. As illustrated in FIGS. 1 and 5, the key 52 is in a position that will allow the greatest number of plugs to pass before preventing passage of the next plug to be seated. FIGS. 4 and 8 show the key in the position where the next plug to seat will not pass.

As configured the tool 10 will pass a number of plugs and then prevent further passage of plugs because the helix sleeve 40 is prevented from rotating by the contact between key 52 and an end 54 of keyway 56. The prevention of rotation of the helix sleeve 40 correspondingly prevents the j-slot sleeve 30 from cycling downhole sufficiently to allow the fingers 18 to reach the recess 28. Consequently the plug 20 cannot pass. This position is illustrated best in FIG. 8 where key 52 is at end 54 and follower 44 is at surface 46 but it cannot slide on surface 46 because the key will no longer allow rotation of the helix sleeve 40 due to having run out of helical track 42. It is to be understood, then, that the maximum number of plugs that are passable through tool 10 are fixed by design during manufacture by the length of the helical track 42 and the keyway 56. This is not to say however that this maximum number of plugs is the only number of plugs that will be passable before a plug is denied passage. Rather, because the key is placable in the keyway 56 as the tool is being run into the hole, at any point on the helical track 42 that is exposed to the keyway 56, any number from the maximum number down to a single plug may be selected.

More specifically, the key 52 is a component of the tool 10 that is removable and replaceable at any point along the keyway 56 where the helical track 42 crosses the keyway 56. The helix sleeve 40 itself may be marked to show how many plugs will pass before denying passage to make it a simple operation in the field for a rig worker to place the key in the keyway 56 to select a number of plug passages to facilitate a particular operation. It should be noted that because of the high pressures generally encountered in the wellbore for operations related to seating plugs and the potential operations that might be effected by pressuring up on such a plug, for example fracturing at about 10,000 psi, the key 52 should be robust in size and construction as it is, in the end, the key that stops movement of the balance of the components.

Figure 9:
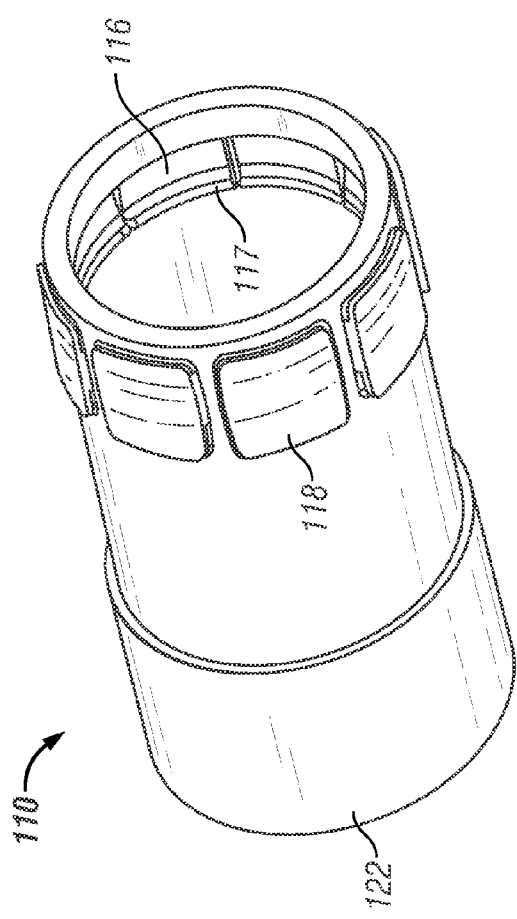
FIG. 9 is a perspective view of an alternate moveable seat substitutable in the tool.
Figure 10:
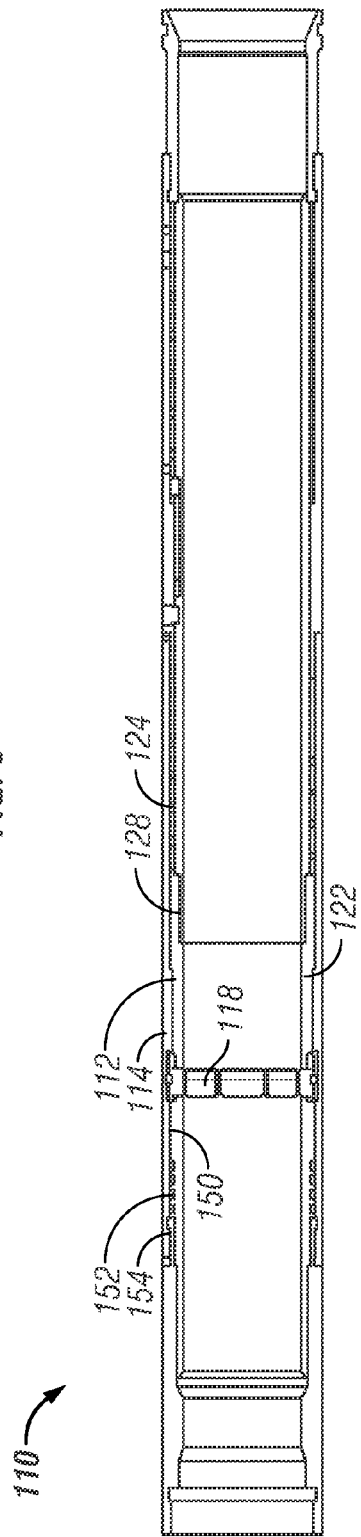
FIG. 10 is a schematic view of a portion of an alternate housing of the tool 10 shown in FIG. 1.

Referring to FIGS. 9 and 10, an alternate embodiment of a portion of plug counter tool 110 is illustrated. The embodiment operates similarly to the tool 10 and identically operating components are not discussed again. The tool is distinct in that a dog-based seat structure 122, having a plug seat 116, is substituted for the collet 22 in the FIG. 1 embodiment. For clarity, numerals are mimicked in the 100 series. In normal operation, dogs 118 function as do the fingers 18 from the previous embodiment. The housing 112 is also distinct in that an additional plug passage recess 150 is provided uphole of the support 114 so that in reverse flow, the one or more dogs 118 can be moved into alignment with the recess 150 to allow passage of one or more plugs 20 in the uphole direction as part of a reverse circulation operation to remove the plugs 20 from the borehole. In order for the structure 122 to move uphole, a plug that had been passed in normal operation of the tool 110 is moved in reverse circulation into a seat 117 on the backside of seat 116. The pressure of reverse circulation acts on the plug in the same manner as in the original operation but in the opposite direction. A spring 152 is disposed uphole of the structure 122 and will be compressed against a top sub 154 at a selected force from fluid pressure on the plug. Movement of the structure 122 in the uphole direction mirrors that of movement in the downhole direction and aligns the dogs 118 with the recess 128, which allows the plug to pass. While an embodiment could eliminate spring 152 and simply allow the structure 122 to stay in the uphole position, including the spring 152 provides the added benefit that the device will automatically revert to a functional state after passage of the plug in the uphole direction so that normal operation of the tool 110 could be resumed if desired. Since reverse circulating has specifically been addressed with respect to this embodiment, it is further noted that a dissolvable or disintegratable plug can be used thereby obviating the need for reverse circulation to remove the plug. Such dissolvable or disintegratable plugs can be used in each embodiment of the invention, if desired.

Figure 11A:
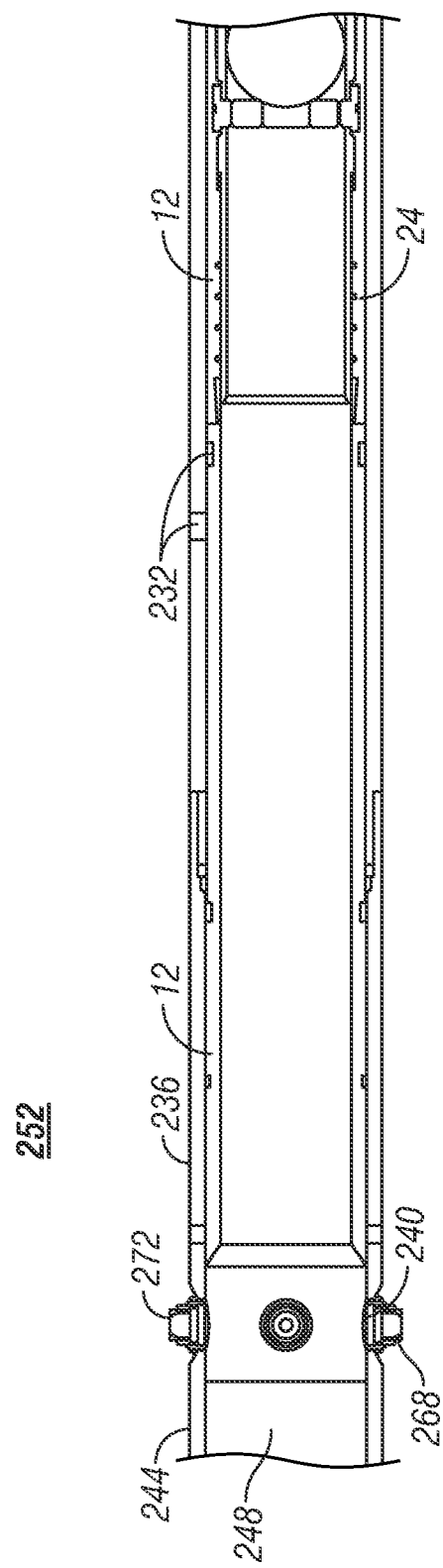
FIGS. 11A-11C depict a cross sectional view of an embodiment of a plug counter disclosed herein.
Figure 11B:
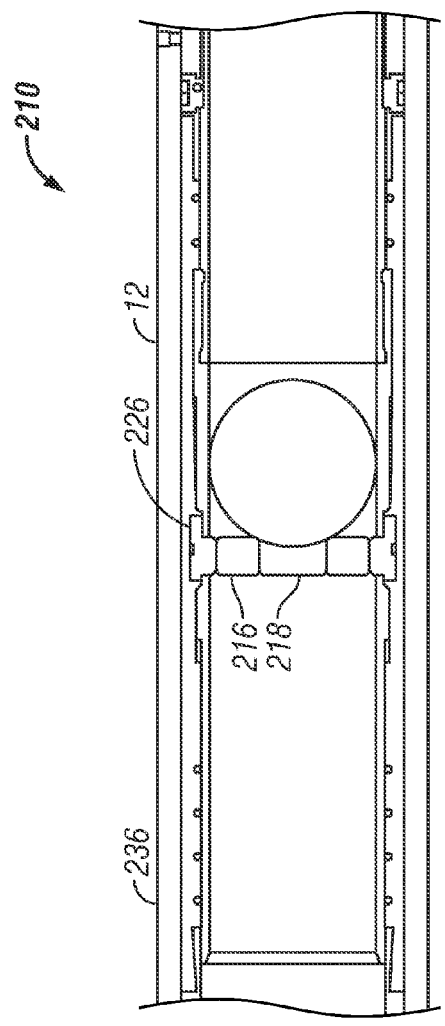
Figure 11C:
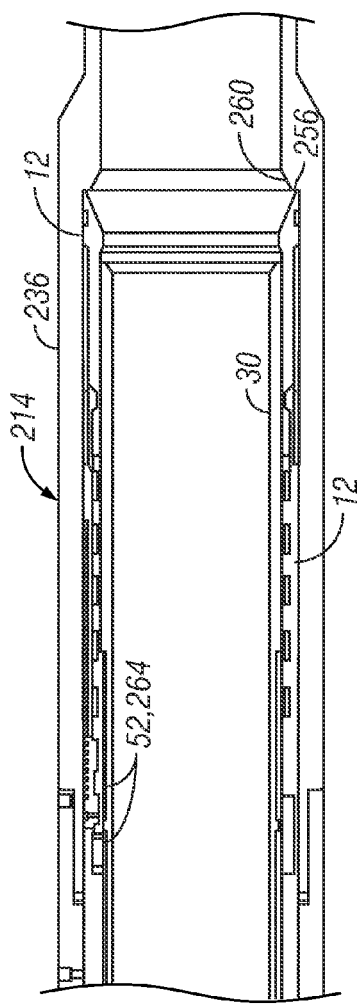

Referring to FIGS. 11A-11C, an embodiment of a plug counter 210, disclosed herein, is illustrated that incorporates features of the tools 10 and 110 therein. The tool 210 includes a helical counter arrangement 214, similar to that disclosed in FIGS. 1-8 therefore the same reference characters are employed here. A plug seat 216 that is passable is also included. The plug seat 216 has one or more dogs 218 that are radially expandable into a recess 226 in a tubular 230 upon longitudinal movement that causes the dogs 218 to align with the recess 226. Although this embodiment employs a single passable seat arrangement it should be understood that any passable seat arrangement could be employed including the plugs seat 16 described in FIGS. 1-4.

A primary difference in the plug counter 210 from that of tools 10 or 110 is what occurs after the selected plug has caused the key 52 to prevent further longitudinal movements of the plug seat 226. Unlike the above embodiments, in the embodiment of counter 210 the plug 20 is still allowed to pass but only after failure of a release member 232 also disclosed herein as a force failing member (shown in FIG. 11A only) illustrated herein as shear pins.

To achieve this the plug counter 210 is configured to index the helical counter 214 each time one of the plugs 20 passes. Doing so entails building pressure against the plug 20, seated against the seat 216, until sufficient pressure is achieved to compress biasing member 24 thereby allowing j-slot sleeve 30 to move relative to housing 12 (in a rightward direction in the Figures). Since the recesses 226 are on the housing 12, the plug 20 is allowed to pass the seat 216 when the j-slot sleeve 30 has moved to the point where the dogs 218 reach the recess 226. As mentioned, each time one of the plugs 20 passes in this manner the helical counter 214 indexes.

After passing the selected number of plugs 20 to cause the helical counter to max out the key 52 prevents the J-slot sleeve 30 from moving at the same force that previously caused it to move. The force increases, in response to pressure increasing uphole of the seated plug 20, until sufficient force is generated to fail a force failing member 232 that holds the housing 12 in position relative to a tubular 236 within which the housing 12 and all the other components discussed previously are positioned. The force failing member 232, shown herein as a shear pin, is shown in an already sheared condition and thus is in two separate pieces.

Longitudinal movement of the housing 12, made possible by failure of the force failing member 232, allows the uncovering of one or more ports 240 formed in a wall 244 of the tubular 236. These ports 240 when uncovered are configured to provide fluidic communication between an inside 248 and an outside 252 of the tubular 236. The ports 240 may, however, be plugged at least for a time as will be discussed further below. The ports 240 disclosed herein are fracing ports that allow fluid pumped therethrough to fracture a formation on the outside 252 of the tubular 236.

Longitudinal movement of the housing 12 relative to the tubular 236 is limited by contact between an end 256 of the housing 12 and a shoulder 260 of the tubular 236. Pressure is again allowed to increase resulting in increased forces in response to the housing 12 not moving. Another force failing member 264 preventing additional travel between the J-slot sleeve 30 and the housing 12 fractures when sufficient force is applied. In this embodiment, this second force failing member 264 is the key 52 itself. Once the key 52 is fractured the J-slot sleeve 30 is again allowed to move relative to the housing 12 until the plug seat 216 aligns with the recess 226, thereby allowing the plug 20 to pass. In order to assure that the ports 240 are uncovered before the plug 20 passes, the first force failing member 232 needs to be set to fail at a lower force than the second force failing members 264.

The foregoing construction allows for any number of the plug counters 210 to be employed for opening fracing ports 240 upon the running of a selected number of plugs 20. A fracing operation can also be carried out just by altering the force need to fail one of the force failing member 232 or 264 at one of the plug counters 210 downhole of the other plug counters 210. The higher threshold need only be set to a pressure higher than is needed to perform a fracing operation to assure that the fracing can take place.

Having a plurality of the ports 240 above a plug counter 210 open can make generating pressure sufficient to fail either force failing member 232, 264 of the downstream plug counter 210 difficult. One way to address this concern is to plug the ports 240 with material that can be removed at a desired later time. For example, a disintegratable material 268 can be used to plug the ports 240 until the ports are exposed to fluid from the inside 248, for example. By fluidically sealing the disintegratable material 268 with a rupturable material 272 on an outer surface thereof, the onset of disintegration can be delayed until the housing 12 has been moved to thereby expose the disintegrable material 268 to the reactive fluids on the inside 248. Alternately, the disintegrable material 268 can be set to disintegrate in response to other stimulus such as changes in temperature and pressure for example.

Yet another method of removing a blockage from the ports 240 at a desired time is by using just the rupturable material 272 without the disintegratable material 268. To do so one need set a pressure at which the rupturable material 272 ruptures at pressures greater than is required to fail the force failing members 232, 264 of all the plug counters 210 that are to be opened for fracing and less than a pressure to fail a force failing member 232, 264 of the plug counter 210 being used to plug the downstream end of the tubular 236.

Figure 12:
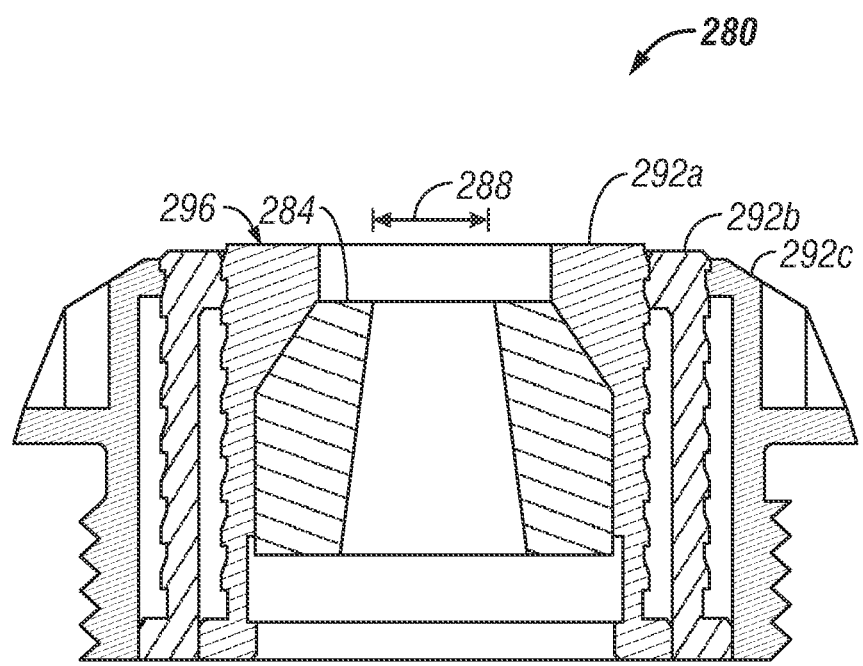
FIG. 12 depicts a magnified cross sectional view of a telescoping port disclosed herein.

Referring to FIG. 12, another embodiment of a port disclosed herein that could allow sufficient pressure to build to fail either force failing member 232, 264 is illustrated at 280. The port 280 includes a nozzle 284 with an opening 288 sized to generate backpressure in response to flow therethrough. A dimension of the opening 288 can be selected based upon the number of the ports 284 that will be open at a given time and flow rates available to generate a backpressure sufficient to fail the applicable force failing member 232, 264. The ports 284 in this embodiment have three optional telescoping sleeves 292A, 292B and 292C, although any number of the sleeves 292 could be employed. The telescoping sleeves 292A, 292B and 292C are configured to extend relative to one another such that a radially outer surface 296 is radially extendable in response to the sleeve 292A moving relative to the sleeve 292B, and the sleeve 292B moving relative to the sleeve 292 C. This configuration allows the sleeve 292A to move into sealing contact with a wall (not shown) of a formation, for example, to facilitate inject of fluid pumped through the port 280, under pressure, directly into the formation. The telescoping sleeves 292A, 292B and 292C can be set to telescope at pressures less than what is required to fail either of the force failing members 232 or 264.

With such a set up a plurality of clusters of plug counters 210 could be positioned along a single tubular 236. Working from the cluster furthest from surface first, each cluster could in sequence be opened and fraced through, all with the same sized plug 20.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A plug counter comprising:
    a seat preventing passage of a plug in a first position and allowing passage of the plug in a second position;
    a first sleeve in operable communication with the seat being longitudinally movable in response to movement of the seat between the first position and the second position;
    a second sleeve in operable communication with at least one of the first sleeve and the seat configured to index upon passage of the plug;
    a key in operable communication with the seat configured to prevent movement of the seat to the second position after the seat has moved back to the first position after a selected number of plugs have passed the seat;
    a third sleeve in operable communication with the first sleeve; and
    a release member in operable communication with the third sleeve configured to move the third sleeve with the first sleeve after release of the release member.

2. The plug counter of claim 1, wherein movement of the third sleeve uncovers one or more ports.

3. The plug counter of claim 2, wherein the one or more ports include a nozzle configured to generate a pressure drop across the nozzle in response to flow through the nozzle.

4. The plug counter of claim 2, wherein the one or more ports include one or more sleeves configured to telescope radially outwardly.

5. The plug counter of claim 2, wherein the one or more ports are occluded with a removable material.

6. The plug counter of claim 5, wherein the removable material is of the removable material.

7. The plug counter of claim 5, wherein the removable material is rupturable.

8. The plug counter of claim 7, wherein the removable material is configured to rupture at a pressure greater than a pressure needed to release the release member and less than a fracing pressure.

9. The plug counter of claim 1, wherein the first sleeve moves relative to the third sleeve after failure of a force failing member.

10. The plug counter of claim 9, wherein the movement of the first sleeve relative to the third sleeve allows the plug to pass the seat.

11. The plug counter of claim 9, wherein the movement of the first sleeve relative to the third sleeve moves the seat from the first position to the second position.

12. The plug counter of claim 1, wherein at least one of the first sleeve and the second sleeve includes a J-slot.

13. The plug counter of claim 1, wherein at least one of the first sleeve and the second sleeve includes a helical channel.

14. The plug counter of claim 1, wherein the release member is configured to release at pressures greater than those needed to perform a fracing operation.

15. The plug counter of claim 1, wherein the seat is radially expandable in the second position to allow passage of the plug.

* * * * *